(12) United States Patent
Wong et al.

(10) Patent No.: US 8,244,846 B2
(45) Date of Patent: Aug. 14, 2012

(54) BALANCED CONSISTENT HASHING FOR DISTRIBUTED RESOURCE MANAGEMENT

(75) Inventors: Kai Chiu Wong, Saratoga, CA (US);
Bala Kumaresan, Palo Alto, CA (US);
Harold B. Prince, Jr., Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 666 days.

(21) Appl. No.: 11/964,264

(22) Filed: Dec. 26, 2007

(65) Prior Publication Data

US 2009/0172139 A1    Jul. 2, 2009

(51) Int. Cl.
*G06F 15/173* (2006.01)
*G06F 15/16* (2006.01)
*G06F 12/08* (2006.01)
*G06F 13/28* (2006.01)

(52) U.S. Cl. ........ 709/223; 709/217; 709/219; 709/225; 711/3; 711/170

(58) Field of Classification Search ...... 711/3, 170–173; 709/223

See application file for complete search history.

(56) References Cited

U.S. PATENT DOCUMENTS

| 7,328,263 | B1 * | 2/2008 | Sadjadi | 709/225 |
| 2002/0162047 | A1 * | 10/2002 | Peters et al. | 714/5 |
| 2006/0129738 | A1 * | 6/2006 | Zohar et al. | 711/3 |
| 2006/0184731 | A1 * | 8/2006 | Corbett et al. | 711/114 |

FOREIGN PATENT DOCUMENTS

EP    1498831    1/2005

OTHER PUBLICATIONS

David Karger et al., "Consistent Hashing and Random Trees: Distributed Caching Protocols for Relieving Hot Spots on the World Wide Web," available via the Internet at www.akamai.com/dl/technical_publications/ConsistenHashingandRandomTreesDistributed CachingprotocolsforrelievingHotSpotsontheworldwideweb.pdf, 1997, pp. 1-10.

Neil Alldrin, "CSE202 Project—Consistent Hashing," available via the Internet at www.neilalldrin.com/research/f02/cse202/cse202_f02.pdf, Nov. 27, 2002, pp. 1-6.

Aditya Akella, "Web Caching and Consistent hashing," available via the Internet at http://pages.cs.wisc.edu/~akella/CS740/S07/notes/lect14.ppt, Mar. 14, 2007, pp. 1-21.

(Continued)

*Primary Examiner* — Wing Chan
*Assistant Examiner* — David X Yi
(74) *Attorney, Agent, or Firm* — Campbell Stephenson LLP (57) ABSTRACT

A method, system, computer-readable storage medium and apparatus for balanced and consistent placement of resource management responsibilities within a multi-computer environment, such as a cluster, that are both scalable and make efficient use of cluster resources are provided. Embodiments reduce the time that a cluster is unavailable due to redistribution of resource management responsibilities by reducing the amount of redistribution of those responsibilities among the surviving cluster members. Embodiments further provide redistribution of resource management responsibilities based upon relative capabilities of the remaining cluster nodes.

19 Claims, 9 Drawing Sheets

OTHER PUBLICATIONS

Gunnar Schomaker et al., "DELIS-TR-0149 Weighted Consistent Hashing," Information Society Technologies, available via the Internet at www.delis.upb.de/paper/DELIS-TR-0149.pdf, 2005, pp. 1-3.

Christian Schindelhauer et al., "Deliverable D6.2.1 Intermediate Report on Concepts for Combining Locality with Hashing," Information Society Technologies, available via the Internet at www.delis.upb.de/deliverables/D6.2.1.pdf, Jan. 2005, pp. 1-13.

Christian Schindelhauer et al., "Weighted Distributed Hash Tables," available via the Internet at cone.informatik.uni-freiburg.de/pubs/WDHT.pdf, 2005, pp. 1-10.

Ion Stoica et al., "Chord: A Scalable Peer-to-Peer Lookup Protocol for Internet Applications," IEEE/ACM Transactions on Networking, IEEE/ACM, New York, NY, vol. 11, No. 1, Feb. 1, 2003, pp. 17-32.

Yasushi Saito et al., "Manageability, Availability, and Performance in Porcupine: A Highly Scalable, Cluster-Based Mail Service," ACM Transactions on Computer Systems ACM USA, vol. 18, No. 3, Aug. 2000, pp. 298-332.

Hong Tang et al., "Differentiated Object Placement and Location for Self-Organizing Storage Clusters," available via the Internet at https://www.cs.ucsb.edu/research/tech_reports/reports/2002-32.pdf, pp. 1-14.

* cited by examiner

BALANCED CONSISTENT HASHING FOR DISTRIBUTED RESOURCE MANAGEMENT

FIELD OF THE INVENTION

The present invention relates to computer resource management, and particularly to a system and method for distributing resource management responsibilities in a multiple computer network.

BACKGROUND OF THE INVENTION

An ever-increasing reliance on information and the computing systems that produce, process, distribute, and maintain such information in its various forms, continues to put great demands on techniques for providing information resources and access to those information resources. Many businesses and organizations have a need not only for a significant amount of computing resources, but also for those resources to be available with a minimal amount of downtime. One solution for such requirements is an environment in which computing resources are clustered together thereby providing a flexible, high-performance, and highly available platform to access shared data in a storage area network environment. A cluster-wide volume and file system configuration allows for simplified and centralized management. An additional benefit is the provision of an integrated cluster volume manager that presents every node in the cluster with the same logical view of the shared device configurations.

An advantage of a cluster environment is the ability to eliminate, or substantially reduce, single points of failure for the access of information. Every compute node in the cluster is provided with the same view of the shared data resources and can access those data resources in the same manner. Thus, if one or more of the computer resources suffers a failure, tasks being performed by the failed systems can be transferred to another compute node for further processing. In order to effectively provide for the elimination, or reduction, of single points of failure with regard to cluster resource management, management is distributed among the member nodes of the cluster.

When a cluster member leaves the cluster, provision must be made for distributing the resource management responsibilities of that node among the remaining cluster members. It is desirable that such redistribution of resource management responsibilities be performed in a manner that makes efficient use of cluster resources, such as computer cycles and network bandwidth. It is further desirable that such redistribution of resource management responsibilities take into account the relative capabilities of the remaining cluster members. It is also desirable that in the performance of redistribution of resource management responsibilities among the cluster members that movement of resource management responsibilities among the remaining nodes be minimized.

SUMMARY OF THE INVENTION

The present invention provides a mechanism for balanced and consistent placement of resource management responsibilities within a multi-computer environment, such as a cluster, that is both scalable and makes efficient use of cluster resources. Embodiments of the present invention reduce the time that a cluster is unavailable due to redistribution of resource management responsibilities by reducing the amount of redistribution of those responsibilities among the surviving cluster members. Embodiments of the present invention further provide redistribution of resource management responsibilities based upon relative capabilities of the remaining cluster nodes.

In one embodiment of the present invention, locations of a plurality of resource identifiers in a resource identification space are determined, the resource identification space is divided into regions of responsibility, and then management responsibility for each region of responsibility is assigned to a corresponding network node. In one aspect of the above embodiment, the resource identification space is a name space, and in a further aspect the names of resources are hashed to determine location within the name space. In another aspect of the above embodiment, the network nodes assigned responsibility for the regions of the resource identification space are members of a cluster of network nodes. In a further aspect of the above embodiment, the size of the area of responsibility is determined by the relative capability of the assigned network node. In another aspect of the above embodiment, when a number of available network nodes changes, due to either removal or addition of a network node, management responsibility for resources is redistributed in a manner that seeks to minimize redistribution of resource management responsibility among the network nodes.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism for balanced and consistent placement of resource management responsibilities within a multi-computer environment, such as a cluster, that is both scalable and makes efficient use of cluster resources. Embodiments of the present invention reduce the time that a cluster is unavailable due to redistribution of resource management responsibilities by reducing the amount of redistribution of those responsibilities among the surviving cluster members. Embodiments of the present invention further provide redistribution of resource management responsibilities based upon relative capabilities of the remaining cluster nodes.

Cluster Environment and Distributed Locks

Figure 1:
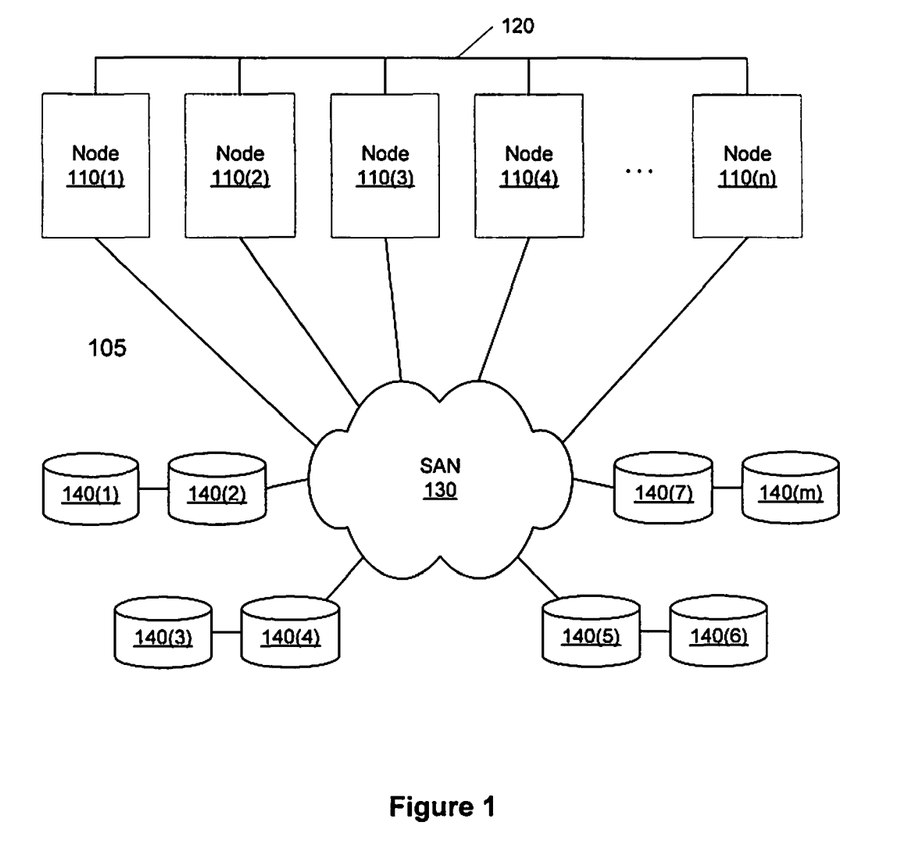
FIG. 1 is a simplified block diagram of a multi-computer network cluster configuration suitable for implementing embodiments of the present invention.

FIG. 1 is a simplified block diagram of a multi-computer network cluster configuration suitable for use by embodiments of the present invention. Cluster 105 includes computer nodes 110(1)-110(n) that are members of the cluster. Computer nodes 110(1)-110(n) are coupled by a network 120. As illustrated, computer nodes 110(1)-110(n) are also coupled to a storage area network (SAN) 130 that provides access to storage volume resources 140(1)-140(m). Alternatively, storage resources can be directly coupled to the various computer nodes via bus-based controllers or coupled, for example, as network accessible storage. Each compute node 110(1)-110(n) has concurrent access to the storage pool of SAN 30. Given this concurrent access to the storage resources, it is necessary to coordinate read/write access to the storage pool to ensure data integrity.

In a cluster environment such as that depicted in FIG. 1, a variety of resources are shared by the member nodes of the cluster. Such resources can include storage resources within SAN 130, applications that can be executed on the various member nodes of the cluster, and the like. Distribution of the management of such resources among the member nodes of the cluster eliminates, or reduces, the presence of a single point of failure to gain access to those resources.

One example of managing access to resources within the cluster is a file locking architecture associated with the cluster file system provided by the storage resources of SAN 130. The cluster file system provides a single version of all files in a cluster that are visible to all nodes in the cluster. If each member node had its own version of a particular file, especially during write access to that file, there is a likelihood of corrupt information being in possession of any one node. To ensure that during any write access to particular data there is only a single version of that data, file locks are implemented in the cluster-wide file system.

Within a single computer system, multiple threads executing a given software application may access or update the same data. The term "thread" is used to describe the context in which a computer program is executed. Coordination among the threads is necessary to ensure that one thread does not read shared data at the same time that another thread is updating that data, thereby possibly resulting in data inconsistency depending upon the timing of the two operations. In a cluster environment, such as that in FIG. 1, where processing for a given software application can be load balanced among the various member nodes, threads that share data can be running on different nodes within the cluster.

Coordination between threads accessing shared data can be implemented using locks. Typically, a lock protects a piece of shared data, for example, a file or a disk block. In a distributed system, such as a cluster, a lock can also protect shared "state" information distributed in memories of each node in the system, such as the online or offline status of a given software application. All shared data is protected by a lock, and locks are typically managed by a lock manager that provides an interface to be used by other application programs to access that data.

A lock to data is requested before the calling application program can access the data protected by the lock. A calling application program can typically request an "exclusive" lock to write or update data protected by the lock or a "shared" lock to read data protected by the lock. If the calling application is granted an exclusive lock, then the lock manager guarantees that the calling program is the only thread holding the lock. If the calling program is granted a shared lock, then other threads may also be holding shared locks on the data, but no other thread can hold an exclusive lock on the data.

The lock manager cannot always grant a lock request right away. Consider an example where one thread has an exclusive lock L on a given set of data, and a second thread requests shared access to the given set of data. The second thread's request cannot be granted until the first thread has released the exclusive lock on the given set of data.

A lock can be placed on data that is stored on a shared disk, such as the volumes accessible through SAN 130. Locks can also be placed on shared data stored in memory for each node, where the data must be consistent for all nodes in a cluster. For example, nodes in a cluster can share information indicating that a file system is mounted. A lock can be placed on the shared state information when the state of the file system changes from mounted to not mounted or vice versa.

Distributed Lock Management

As stated above, a lock manager responds to requests for access to data protected by a lock. In a cluster environment, it is desirable that resource managers, such as lock managers, be distributed throughout the member nodes of the cluster in order to provide for the desired elimination or reduction of a single point of failure.

Figure 2:
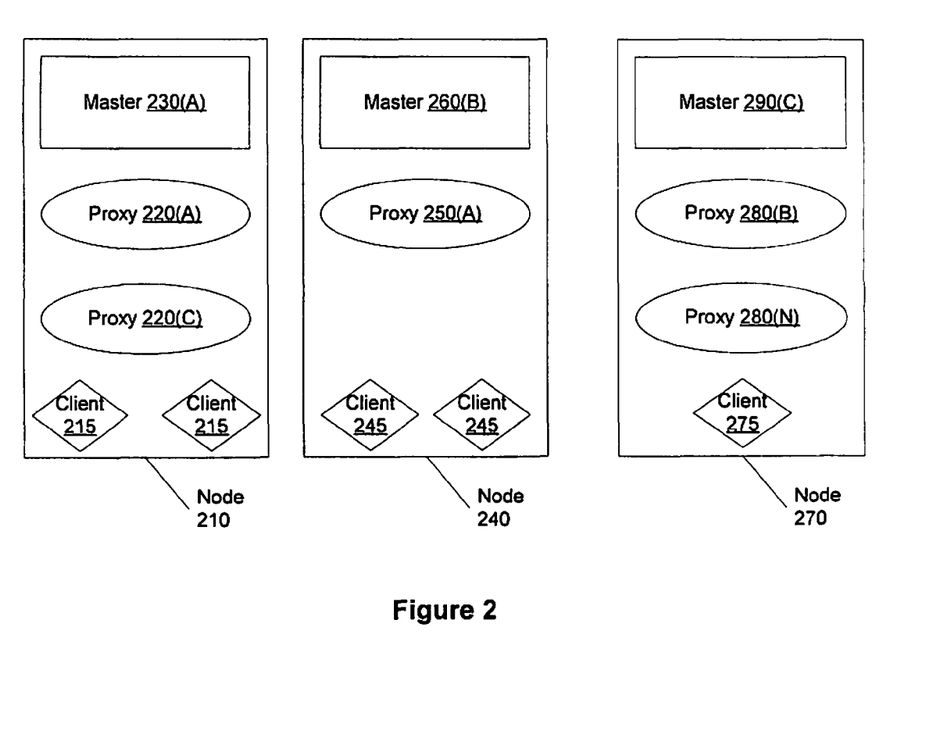
FIG. 2 is a simplified block diagram of a two-level lock manager environment that provides distributed lock management, usable by embodiments of the present invention.

FIG. 2 is a simplified block diagram of a two-level lock manager environment that provides distributed lock management, usable by embodiments of the present invention. For example, client thread 215 in node 210 requests a Lock A through Proxy 220(A). In such a system, there is one proxy per lock per node that holds or requests the lock. For example, there can also be a proxy for Lock A on node 240 (Proxy 250(A)) that corresponds to a client 245 holding or requesting the Lock A on node 240. However, if node 240 does not already have access to Lock A, then Proxy 250(A) will request Lock A from the master for Lock A. As illustrated in FIG. 2, the master for Lock A is Master 230(A) located on node 210. There is one master per lock in the cluster. If the master is not located on the node executing the requesting thread, then a master table located on the node is consulted to find the identification of a remote node providing the master for the requested lock. For example, if a client requested a Lock C from Proxy 220(C) on node 210, then Proxy 220(C) would request Lock C from Lock C Master 290(C) located on node 270. Should node 210 already have been granted Lock A for a different thread, then Proxy 220(C) can manage distribution of Lock C to the requesting client without further request to a lock master. While the above examples discuss one thread accessing a lock through a proxy, it should be noted that multiple threads can access a lock on a node through a single proxy. Further, a thread can access multiple locks through corresponding proxies on a single node.

Since the nodes within a cluster are not necessarily homogeneous, either in the type or configuration of the computer that comprises the node or in the processes executing on the node, it is desirable to distribute the various lock masters according to the relative capabilities of the cluster member nodes in order to fairly distribute the load for mastering these resources. Factors involved in determining a node's capability can include, for example, processor speed, number of processors on the node, available memory size, and desired load on the node. Capability of a node can be automatically detected or an administrator of the cluster can define the capability and that information can be used in determining distribution of lock masters among the various nodes.

Figure 3:
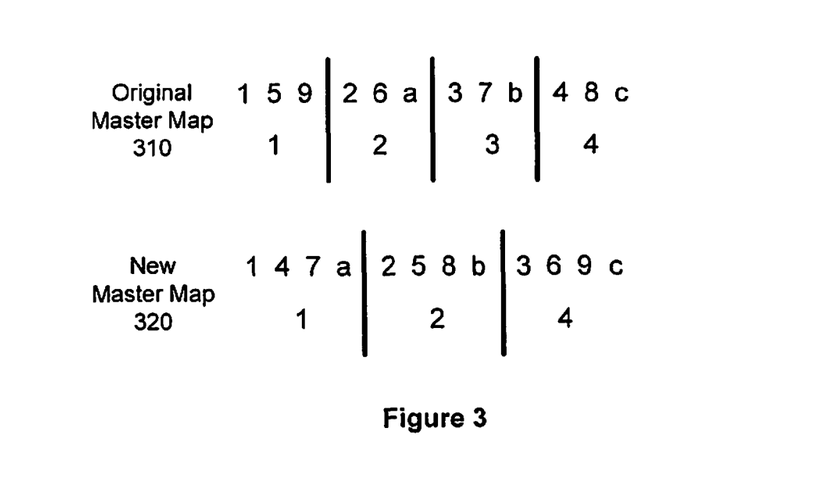
FIG. 3 is an illustration of how lock masters can be distributed among the various member nodes of a cluster.

FIG. 3 is an illustration of how lock masters can be distributed among the various member nodes of a cluster. An original master map 310 illustrates how Lock Masters 1-c are associated with members of a four-node cluster. In this illustration, the Lock Masters are evenly distributed across the nodes based upon the name of the locks associated with the masters. Lock names are uniquely determined from, for example, file system information such as inode, lock type, or volume.

One method for distributing the lock master uses a hashing of the lock name. The node ID that is to host the master for the lock is determined as the hash value (modulo n), where n is the number of nodes available to host masters in the cluster. If a node leaves the cluster (e.g., node 3), then a new master map 320 is generated using the same algorithm. Thus, because the host ID for the master is based upon hash value (modulo n), most of the lock masters are relocated among the surviving nodes. The number of masters that are relocated is $((n-1)/n)$ *number of lock masters.

Under the system illustrated in FIG. 3, since most of the masters have to be relocated, it is reasonable to discard all of the old master information and rebuild new master tables on each cluster node. Once the new masters have been redistributed, the surviving proxies then send lock states to the various new masters. One problem with such a system is that as the number of locks and the cluster size increases, an increasing amount of cluster unavailability is incurred while waiting for the masters to be redistributed and the proxies to transmit their lock states. Further, the above algorithm for determining master host IDs for the locks does not take into account relative capabilities of the nodes in performing the redistribution. Further, after a reconfiguration of the cluster processing costs are significant because each lock ID needs to be rehashed and the master host IDs need to be recalculated in light of the surviving number of nodes in the cluster.

Balanced Consistent Hashing

Embodiments of the present invention use a mechanism of balanced consistent hashing to reduce not only the calculation involved in determining master host IDs, but also reduce the number of masters that need to be redistributed among the various surviving nodes in the cluster. A resource identification "space" is defined by identifiers for each resource whose associated master is to be distributed in the cluster. Embodiments of the present invention perform a hash calculation once for the various lock names within the cluster and determine therefrom the extent of the resource identification space, which extends from the minimum calculated hash value to the maximum calculated hash value. This resource identification space is then apportioned among the cluster member nodes according to those nodes' relative capabilities. If a node should leave or enter the cluster, then the resource identification space is reapportioned among the surviving cluster member nodes.

Figure 4:
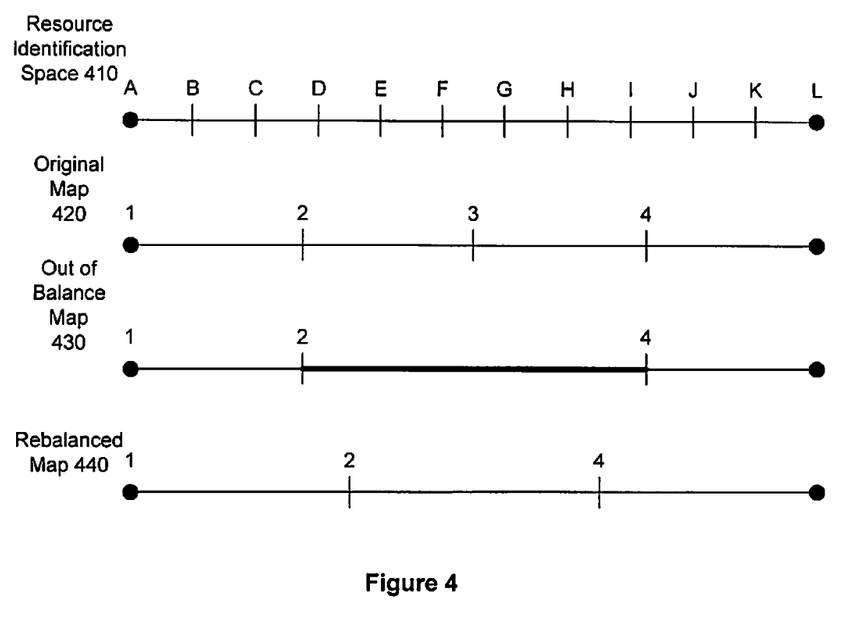
FIG. 4 is a simplified diagram illustrating distribution of locks according to a balanced consistent hashing mechanism, in accord with embodiments of the present invention.

FIG. 4 is a simplified diagram illustrating apportionment of locks according to a balanced consistent hashing mechanism in accord with embodiments of the present invention. Resource identification space 410 illustrates a distribution of hash values for lock identifiers from a minimum value to a maximum value of those hash values. For the sake of illustration, Locks A-L have been evenly distributed through the resource identification space, but it should be noted that such an even distribution is not necessary. An original mapping 420 of cluster member nodes 1-4 is further shown. For the sake of this example, a four-node cluster is used and the relative capabilities of each node are considered to be the same. Thus, each area of responsibility for the lock management hash space is evenly divided among the four nodes.

An out of balance map 430 is illustrated for a scenario in which node 3 leaves the cluster. In the illustrated scenario, the area of responsibility for node 2 is merely extended into the area responsibility for node 3, thereby making node 2 responsible for all lock management originally performed by node 3. This scenario is considered out of balance because node 2 is required to expend more resources than either nodes 1 or 4 to perform lock management tasks.

A rebalanced map 440 of lock masters is more desirable in order to have the surviving nodes more evenly share the load. As illustrated, mastering for Lock D moves from node 2 to node 1, even though node 2 remains in the cluster. Responsibility for the masters for Locks G and H, which were originally performed by node 3, are now performed by node 2. Responsibility for the master for Lock I, which was originally performed by node 3 is moved to node 4.

In performing the rebalancing for map 440, only four of the 12 lock masters are relocated after node 3 leaves the cluster. This is in comparison to the nine masters $(((n-1)/n)*$number of lock masters) that would be moved under the system illustrated in FIG. 3. Thus, a significant amount of resources can be conserved through the use of the balanced consistent hashing mechanism illustrated in 440 in both computer cycles required to recreate a lock master (as will be discussed more fully below) and network resources required for the various proxies to send their states to the new lock masters. Further, since the lock identifiers are not rehashed, there is additional saving in computer resources.

As the number of nodes and resources being mastered increases, the number of resource masters that get redistributed asymptotically approaches approximately one-third of the total number of the resource masters. The number of redistributed resource masters also is sensitive to whether a node responsible for one of the "edges" of the resource identification space versus a node responsible for the middle of the space becomes unavailable. One embodiment of the present invention resolves this edge sensitivity by modeling the resource identification space without edges, that is, for example, linking the "A" edge of the resource identification space 410 to the "L" edge of the resource identification space.

An alternative balanced consistent hashing method can be realized by just moving the lock masters from a node that has left the cluster to the surviving nodes. Using the example in FIG. 4, in which node 3 leaves the cluster, the lock master corresponding to Lock G can be moved to node 1, H to node 2, and I to node 4. This results in the number of masters being moved equaling 1/n, where n is the number of nodes in the original cluster.

Selection of master nodes from a set of cluster member nodes is performed using both an array of available nodes and a resource identification space. The master node ID array (master_nid[idx]) contains a sorted list of cluster member node IDs that are replicated based on a scaled weight of each node. The scaled weight of each node is based upon the relative capability of a node versus the other nodes in the array. For example, if nodes 1 and 3 carry a weight of one while node 2 carries a weight of two, then the master_nid array will contain entries {1, 2, 2, 3}. The total weight (tot_weight) of the array is the number of entries in the master_nid array. So, in the above example, tot_weight=4. A master for a lock resource can be assigned to a node represented in master_nid by calculating the hash value of the name of the lock and dividing that hash value by a maximum value in the hash value space (max_hash) and multiplying the resultant value by the total weight and using that value as the index to look up a master node ID value from the master_nid array. Thus, the equation for arriving at the index for the master_nid array is:

$$idx=(hashval/max\_hash)*tot\_weight$$

One can see that the above equation for the master_nid index calculates a normalized value for the hash of the lock name against the maximum hash value and multiplies that normalized value against the total number of entries in the master_nid array.

In one embodiment of the present invention, integer arithmetic is alternatively used to calculate the index of the master_nid array. In this embodiment, the index is calculated as follows:

$$idx=(hashval11*tot\_weight)>>11$$

Hashval11 is the least significant 11 bits of the calculated hash value for the lock name. Hashval11 is then multiplied by the total weight of the master_nid array. The resultant value is then right shifted by 11 bits to yield the index value. In this embodiment, the 11 bits and the right shifting of 11 bits are chosen in relation to a selected maximum number of hash values that can be tracked during relocation.

An alternative mechanism for balanced consistent hashing has already been discussed, in which only the lock masters associated with a node that has left the cluster are relocated, and those lock masters associated with the remaining nodes in the cluster are kept with those nodes. An example of such an embodiment is described herein. As discussed above, the master_nid array contains entries based upon the scaled weight of each node in a cluster. For a new cluster, or for an existing cluster in which a node joins, the master_nid array is stored as a level-1 mapping table. This alternative mechanism introduces a second level mapping table (e.g., a level-2 mapping table) when a node leaves the cluster. When a node leaves the cluster, those entries in the master_nid array that correspond to a node that is no longer in the cluster are replaced by a null value, and this modified master_nid array is retained as the level-1 mapping table. A level-2 mapping table is then constructed based upon the scaled weights of the surviving nodes. The level-2 mapping table is used to redistribute masters from departed nodes to surviving nodes. During a master node ID lookup, the index for the level-1 table is calculated by one of the above-described methods. If the node ID in the level-1 mapping table is null, then a second index is calculated for the level-2 table. An example of an equation for calculating this level-2 index is as follows:

$$idx2=(((((hashval11)\&0x3f)<<5)|((hashval11)>>6)) *tot\_weight2)>>11$$

In the above equation, hashval11 is the least-significant 11 bits of hashval and tot_weight2 is the size of the level-2 mapping table. Again, use of the least-significant 11 bits of hashval and right shifting by 11 bits relates to table sizes used for tracking relocated masters.

Although the above alternative embodiment of the present invention utilizes two levels of mapping tables, it should be noted that any number of levels of mapping tables can be used, each level corresponding to an event changing the number of nodes in the cluster. The number of such tables used implicates memory resources needed to store the tables, and also compute resources used in performing multiple levels of table lookup. Further, as stated above, when a new node enters the cluster, a level-1 mapping table is constructed. Thus, in the above-described embodiment, when a new node enters a cluster in the same time period that an existing node leaves the cluster, only a level-1 mapping table is constructed.

It should also be noted that although the example illustrated in FIG. 4 involves the removal of a node from the network environment and a subsequent redistribution of the resource management to the remaining nodes, the methodology also encompasses an addition of a node to the network environment and allows for the distribution of resource management responsibilities to the additional node.

Figure 5A:
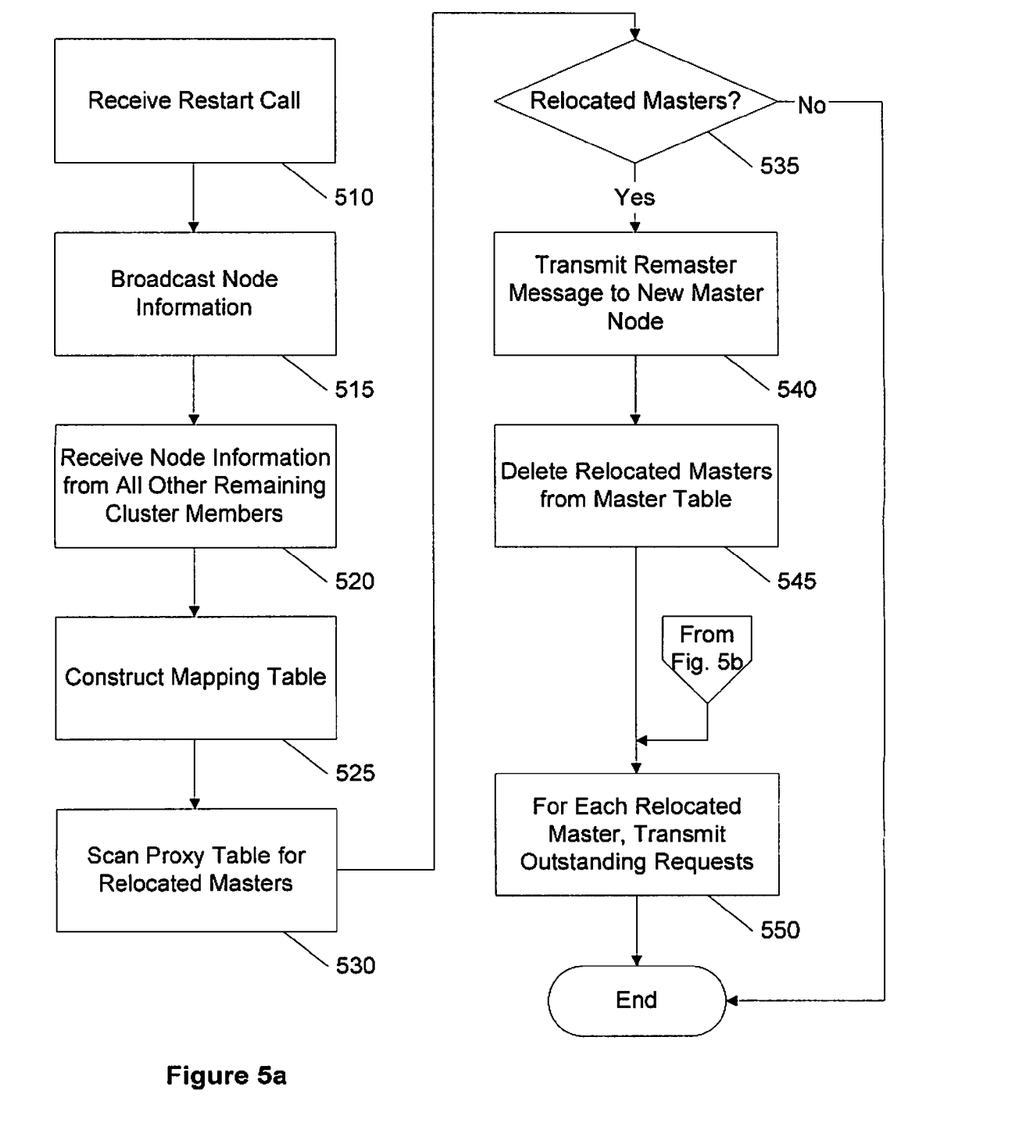
FIG. 5 is a simplified flow diagram illustrating one embodiment of tasks performed by a cluster node during a mapping table rebuild process, in accord with embodiments the present invention.

FIG. 5a is a simplified flow diagram illustrating one embodiment of tasks performed by a cluster node during a mapping table rebuild process, in accord with the present invention. Lock master redistribution is initiated by a restart call that is triggered by a cluster membership change (510). Such a cluster membership change can be detected by a cluster membership monitor and identified by the presence of a new membership identifier joining a cluster or the absence of a node from the cluster after a timeout period or an explicit departure indication from a node. In response to the restart call, each node in the cluster will broadcast information about that node to all the other nodes (515). Such node information includes, for example, node capability information, such as that described above, and an indication of when the node joined the cluster (e.g., a node joined time stamp). The node can then wait to receive node information from all the other remaining cluster members (520).

In light of the information received from the other nodes, each node then constructs a level-1 or level-2 mapping table, as discussed above (525). A proxy table stored at each node is scanned to determine if any of the proxies relates to a relocated master by referencing the new mapping table using the balanced consistent hashing methods discussed above and comparing the result of the reference to the new mapping table with a record of the previous masters for the proxies (e.g., a remote master table) (530). If there are no relocated masters (535) then the proxies on the node need not send information to their associated master. This is a distinguishing feature of the balanced consistent hashing method over the prior art in that in the prior art, discussed above, almost all of the masters are relocated and therefore master tables are completely reconstructed and all proxies must send information to their masters. If a proxy does have an associated relocated master (535), then a remaster message is transmitted to the node that is now responsible for mastering the lock ID (540). This is performed for each proxy having a relocated master. A node can indicate that the node has completed sending remaster messages by, for example, broadcasting a message to all nodes in the cluster that indicates that the node has finished sending remaster messages (e.g., a "DONE_REMASTER" message).

Figure 6:
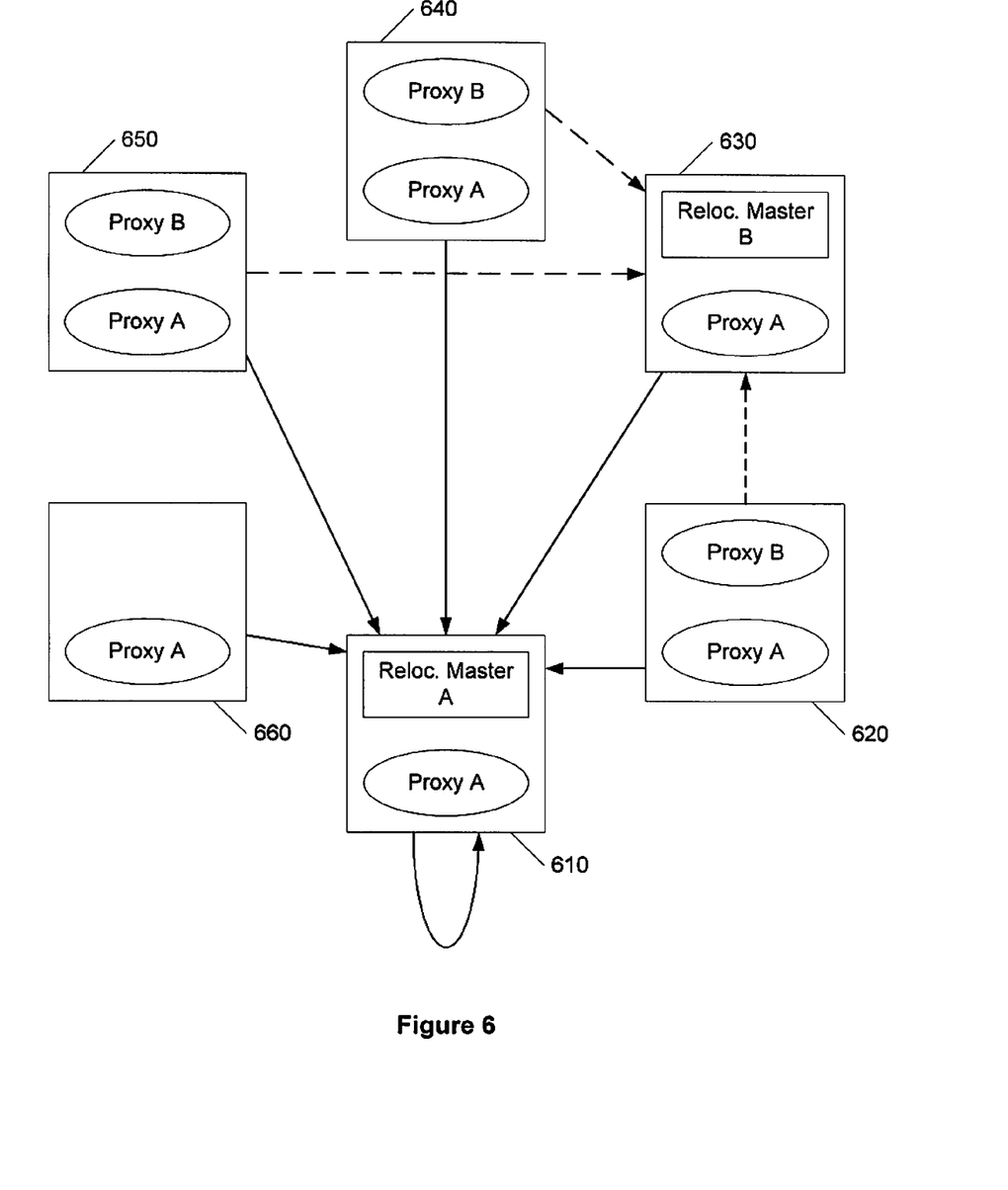
FIG. 6 is a simplified block diagram illustrating remaster message traffic between proxies and relocated masters in a cluster environment in accord with embodiments of the present invention.

FIG. 6 is a simplified block diagram illustrating remaster message traffic between proxies and relocated masters in a cluster environment in accord with embodiments of the present invention. FIG. 6 illustrates nodes 610-660 that are members of a cluster. Node 610 is responsible for Lock Master A. Upon discovering that Lock Master A has been relocated to node 610, each node in the cluster that has a proxy for Lock A communicates a remaster message to node 610. Such a remaster message includes the state of the proxy on each node that has a proxy for Lock A. Similarly, node 630 is responsible for relocated Lock Master B, and those nodes having a proxy for Lock B transmit a remaster message to node 630. From this figure, it can be appreciated that the greater the number of relocated lock masters, the greater the amount of network traffic due to remaster messages. Further, as the number of nodes and proxies increases, the network traffic will also increase. Therefore, a mechanism by which relocation of lock masters is kept to a minimum will conserve network resources (e.g., bandwidth) significantly.

Returning to FIG. 5a, the node will also delete any masters relocated from that node from the node's master table (545). After the node modifies the node's own master table and performs housekeeping tasks on queues related to the modified master table (e.g., discussion related to FIG. 5B, below), for each relocated master associated with a proxy on the node, any outstanding requests from that node's proxies can be transmitted to the relocated master (550).

Figure 5B:
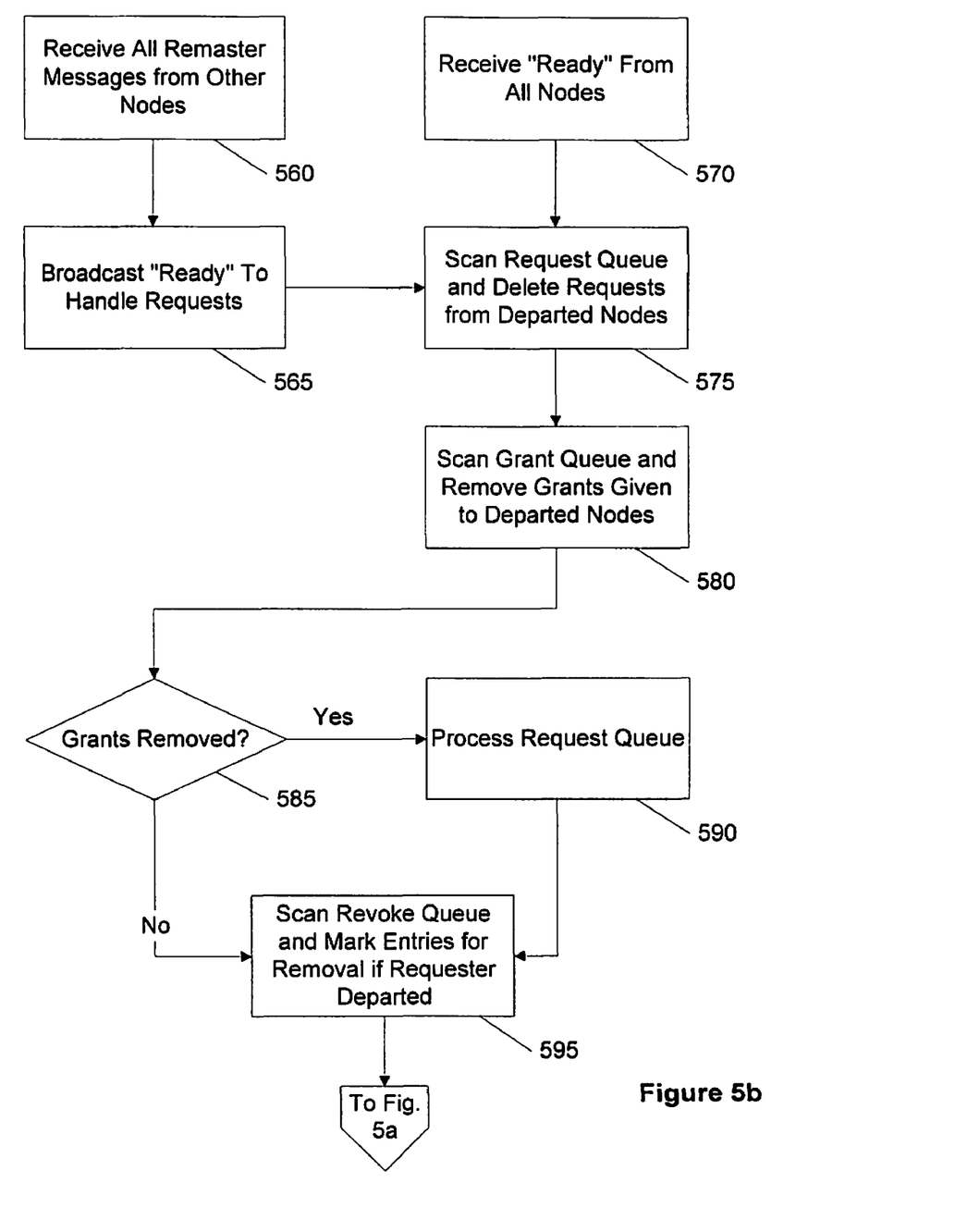

FIG. 5b is a simplified flow diagram illustrating tasks performed in housekeeping tasks related to the modified master table, in accord with embodiments of the present invention. A determination can then be made as to whether the node has received all remaster messages from every node (560). Such a determination can be made, for example, by determining if the node has received a "DONE_REMASTER" message from all the other cluster nodes, as described above. If not, then the node can wait for additional remaster messages. If all remaster messages have been received, then the node broadcasts an indication that it is "ready" to handle requests for the locks being mastered by that node (565). The node can then wait to receive a "ready" indication from all the other nodes in the cluster (570), and upon doing so can perform tasks related to cleaning up the master table on that node. The node can, for example, scan a request queue and delete requests for lock resources from nodes that have departed the cluster (575). The node can scan a grant queue and remove grants that have been granted to nodes that have departed the cluster (580). If grants have been removed (585), then the node can process the request queue to determine if any requested lock resources can now be granted in light of the removal of grants (590). A revoke queue for requests to revoke otherwise locked resources (by other threads) can be scanned and if a requester for a revoke has been removed from the cluster, then that entry can be deleted when all the revokes are completed instead of being promoted to the grant queue (595).

Figure 7:
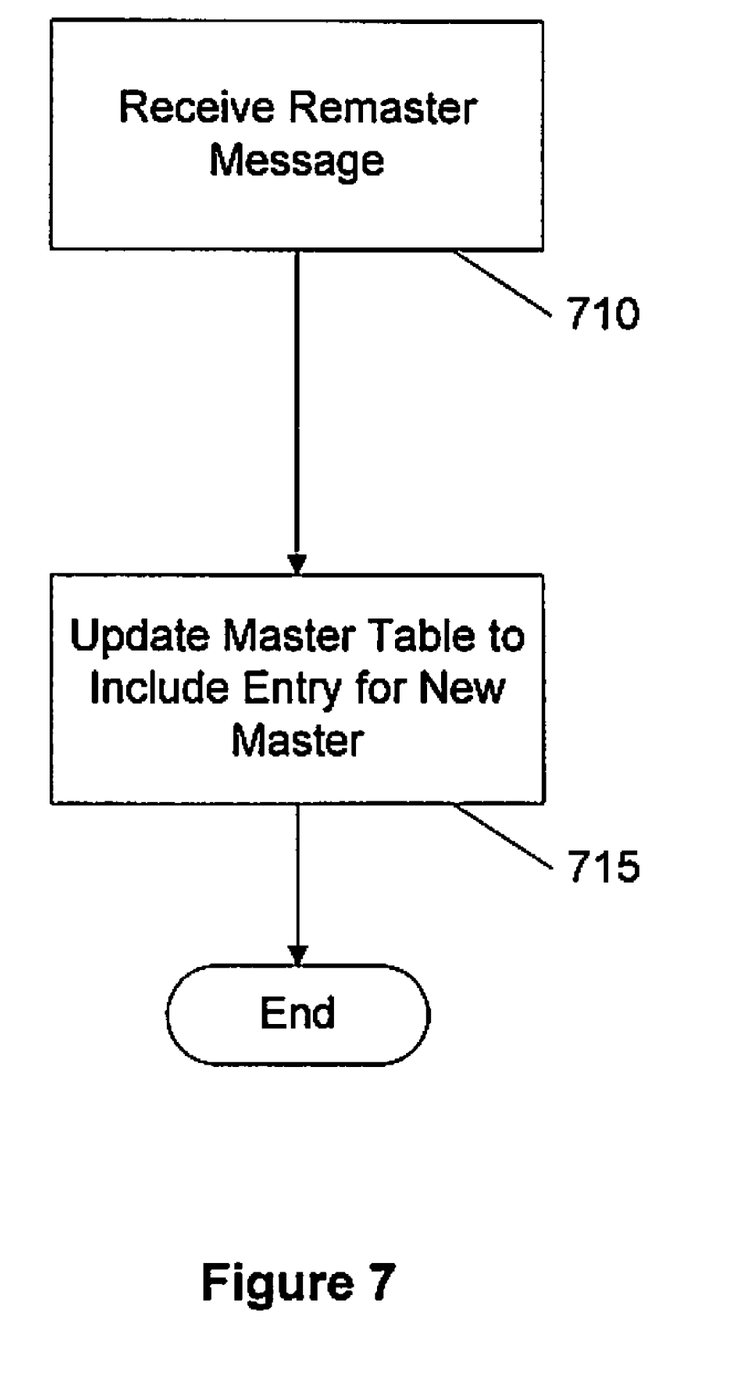
FIG. 7 is a simplified block diagram illustrating some of the tasks performed in setting up new masters on cluster nodes during a lock master redistribution, in accord with embodiments of the present invention.

Although illustrated in sequence, many of these tasks can be performed concurrently by a node (e.g., proxy table scanning (530), deleting relocated masters (545), scanning the request and grant queues (575 and 580), and updating the master table (715, below)), thereby reducing the amount of time involved in redistribution of masters among the member nodes.

Part of the process of implementing new master tables involves removing stale messages. Stale messages that are either to or from nodes from which a master has been relocated are discarded. Stale messages can also be discarded from sending nodes that are no longer members of the cluster. Further, any messages that were sent before either the sender or the receiver joined the cluster can also be discarded.

FIG. 7 is a simplified block diagram illustrating some of the tasks performed in setting up new masters on cluster nodes during a lock master redistribution. A node begins the process upon receiving a remaster message (710), such as that sent during 540. The node then updates the master table of that node to include an entry for the new master for which the node is responsible (715).

Resource management redistribution in a network cluster environment has been described above using an example of lock resource management. It should be understood, that the concepts from the present invention can be applied to distributed management of other types of resources within a distributed computing environment in which such resources are shared. The principles of the present invention are not limited to lock management but can also be applied to, for example, management of applications in a distributed computing environment or providing a plurality of electronic mail servers each of which is responsible for a range of recipient electronic mail addresses for a network.

An Example Computing and Network Environment

As shown above, the present invention can be implemented using a variety of computer systems and networks. An example of one such computing and network environment is described below with reference to FIGS. 8 and 9.

Figure 8:
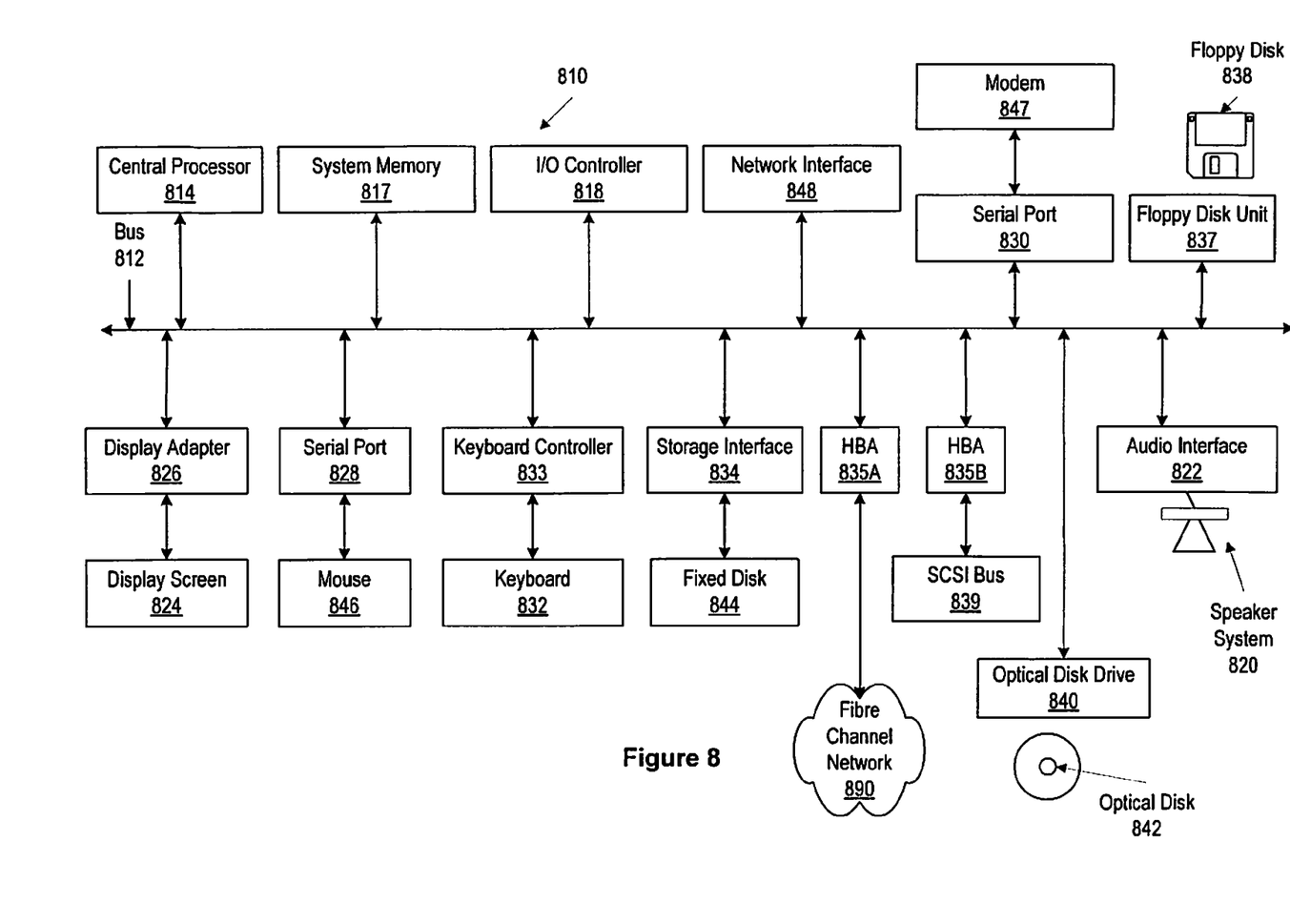
FIG. 8 depicts a block diagram of a computer system suitable for implementing embodiments of the present invention.

FIG. 8 depicts a block diagram of a computer system 810 suitable for implementing the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present invention. The devices and subsystems can be interconnected in different ways from that shown in FIG. 8. The operation of a computer system such as that shown in FIG. 8 is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
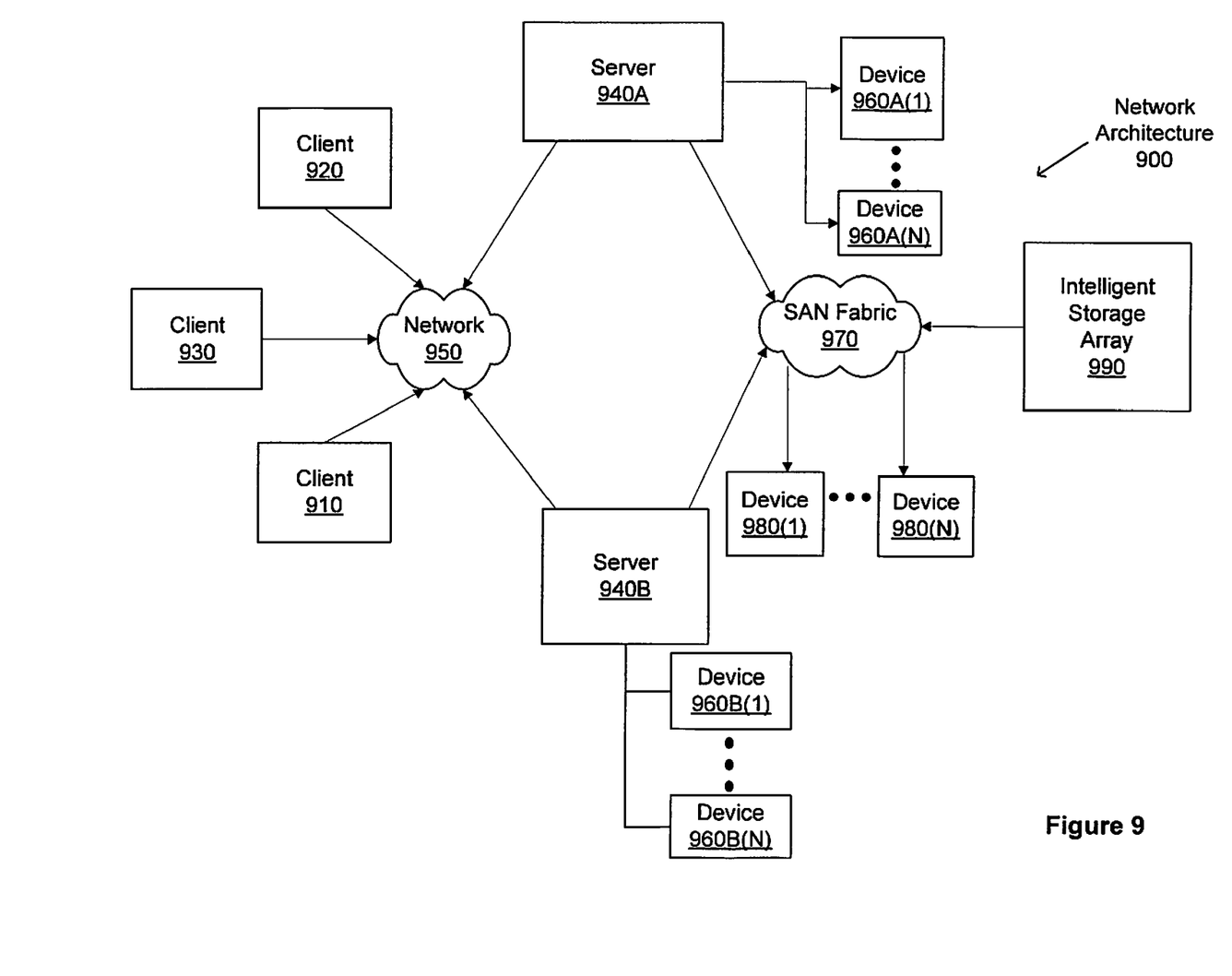
FIG. 9 is a block diagram depicting a network architecture suitable for implementing embodiments of the present invention.

FIG. 9 is a block diagram depicting a network architecture 900 in which client systems 910, 920 and 930, as well as storage servers 940A and 940B (any of which can be implemented using computer system 810), are coupled to a network 950. Storage server 940A is further depicted as having storage devices 960A(1)-(N) directly attached, and storage server 940B is depicted with storage devices 960B(1)-(N) directly attached. Storage servers 940A and 940B are also connected to a SAN fabric 970, although connection to a storage area network is not required for operation of the invention. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   determining locations of a plurality of resource identifiers in a resource identification space, wherein
      the determining is performed by a computer;
   dividing the resource identification space into a first plurality of disjoint areas of responsibility, wherein
      the dividing is performed by the computer;
   associating each area of responsibility with a distinct network node of a plurality of network nodes, wherein
      the associating is performed by the computer,
      each network node of the plurality of network nodes is a member of a cluster, and
      a sum of all the areas of responsibility encompasses the entire resource identification space;
   assigning management responsibility for a resource associated with a resource identifier located in a first area of responsibility to a network node associated with the first area of responsibility, wherein
      the assigning is performed by the computer,
      the resource is shared by the network nodes, and
      the assigning comprises distributing lock mastering responsibilities associated with the resource identifier to the network node associated with the first area of responsibility;
   detecting that a first network node is added to or removed from the network;
   performing said dividing and said assigning using a current number of network nodes available to be associated with an area of responsibility into a second plurality of areas of responsibility, in response to said detecting; and
   maximizing an overlap of areas of responsibility between the first plurality of areas of responsibility and the second plurality of areas of responsibility.

2. The method of claim 1 wherein the resource identification space is a name space.

3. The method of claim 2 further comprising:
   calculating a resource identifier of the plurality of resource identifiers by hashing a name of the resource.

4. The method of claim 3 further comprising:
   deriving the name of the resource using an inode identifier, wherein the resource is one of a file and a storage location in a file system.

5. The method of claim 3 further comprising:
   deriving the name of the resource using an electronic mail address, wherein
      the resource is one of a mailbox, state information associated with the mailbox, metadata associated with the mailbox, management information associated with the mailbox, and mail data in an electronic mail system.

6. The method of claim 1 wherein a resource identified by one of the plurality of resource identifiers is accessible to all members of the cluster.

7. The method of claim 1 further comprising:
   determining the area of responsibility for the associated network node based on a capability of the associated network node.

8. The method of claim 7 further comprising:
   relating the capability of the associated network node to one or more of processor capacity and memory capacity.

9. The method of claim 7 further comprising:
   defining the capability of the associated network node by user input.

10. The method of claim 7 wherein the capability of the associated network node is defined relative to each other network node of the plurality of network nodes.

11. A non-transitory computer-readable storage medium comprising:
    a first set of instructions, executable by a processor, configured to determine locations of a plurality of resource identifiers in a resource identification space;
    a second set of instructions, executable by the processor, configured to divide the resource identification space into a first plurality of disjoint areas of responsibility, and associate each area of responsibility with a distinct network node of a plurality of network nodes, wherein
       each network node of the plurality of network nodes is a member of a cluster, and
       a sum of all the areas of responsibility encompasses the entire resource identification space;
    a third set of instructions, executable by the processor, configured to assign management responsibility for a resource associated with a resource identifier located in a first area of responsibility to a network node associated with the first area of responsibility, wherein
       the resource is shared by the network nodes, and
       the assigning comprises distributing lock mastering responsibilities associated with the resource identifier to the network node associated with the first area of responsibility; and
    a fourth set of instructions, executable by the processor, configured to detect that a first network node is added to or removed from the network;
       divide the resource identification space and assign management responsibility using a current number of network nodes available to be associated with an area of responsibility into a second plurality of areas of responsibility, in response to detect that first network node is added or removed from the network, and
       maximize an overlap of areas of responsibility between the first plurality of areas of responsibility and the second plurality of areas of responsibility.

12. The non-transitory computer-readable storage medium of claim 11 wherein the resource identification space is a name space.

13. The non-transitory computer-readable storage medium of claim 12 further comprising:
    a fifth set of instructions, executable by the processor, configured to calculate a resource identifier of the plurality of resource identifiers by hashing a name of the resource.

14. The non-transitory computer-readable storage medium of claim 11 further comprising:
    a fifth set of instructions, executable by the processor, configured to determine the area of responsibility for the associated network node based on a capability of the associated network node.

15. A system comprising:
    a plurality of network nodes, wherein
       each network node of the plurality of network nodes comprises a corresponding processor, a memory coupled to the processor, and a network interface coupled to the processor, and
       the memory of each network node stores
          a first set of instructions, executable by the processor of the network node, configured to determine locations of a plurality of resource identifiers in a resource identification space,
          a second set of instructions, executable by the processor of the network node, configured to divide the resource identification space into a first plurality of disjoint areas of responsibility, and associate each area of responsibility with a distinct network node of the plurality of network nodes, wherein
each network node of the plurality of network nodes is a member of a cluster, and
a sum of all the areas of responsibility encompasses the entire resource identification space, and
a third set of instructions, executable by the processor of the network node, configured to assign management responsibility for a resource associated with a resource identifier located in a first area of responsibility to a network node associated with the first area of responsibility, wherein
the resource is shared by the network nodes, and
the assigning comprises distributing lock mastering responsibilities associated with the resource identifier to the network node associated with the first area of responsibility;
a fourth set of instructions, executable by the processor, configured to
detect that a first network node is added to or removed from the network;
divide the resource identification space and assign management responsibility using a current number of network nodes available to be associated with an area of responsibility into a second plurality of areas of responsibility, in response to detect that first network node is added or removed from the network, and
maximize an overlap of areas of responsibility between the first plurality of areas of responsibility and the second plurality of areas of responsibility; and
a network configured to couple the plurality of network nodes to one another wherein the network is coupled to the network interface of each network node.

16. The system of claim 15 wherein the memory of each network node further stores:
a fifth set of instructions, executable by the processor of the network node, configured to calculate a resource identifier of the plurality of resource identifiers by hashing a name of the resource, wherein the resource identification space is a name space.

17. The system of claim 15 wherein the memory of each network node further stores:
a fifth set of instructions, executable by the processor of the network node, configured to determine the area of responsibility for the associated network node based on a capability of the associated network node.

18. An apparatus comprising:
a network node of a plurality of network nodes, wherein each network node of the plurality of network nodes is a member of a cluster;
means for determining locations of a plurality of resource identifiers in a resource identification space;
means for dividing the resource identification space into a first plurality of disjoint areas of responsibility, and associating each area of responsibility with a distinct network node, wherein
a sum of all the areas of responsibility encompasses the entire resource identification space;
means for assigning management responsibility for a resource associated with a resource identifier located in a first area of responsibility to a network node associated with the first area of responsibility, wherein
the resource is shared by the network nodes;
means for detecting that a first network node is added to or removed from the network;
means performing said dividing and said assigning using a current number of network nodes available to be associated with an area of responsibility into a second plurality of areas of responsibility, in response to said detecting; and
means for maximizing an overlap of areas of responsibility between the first plurality of areas of responsibility and the second plurality of areas of responsibility.

19. The method of claim 1, further comprising:
the distinct network node sending a message to each other node in the cluster in response to a cluster restart, wherein
the cluster restart is performed in response to a cluster membership change.

* * * * *